UNITED STATES PATENT OFFICE.

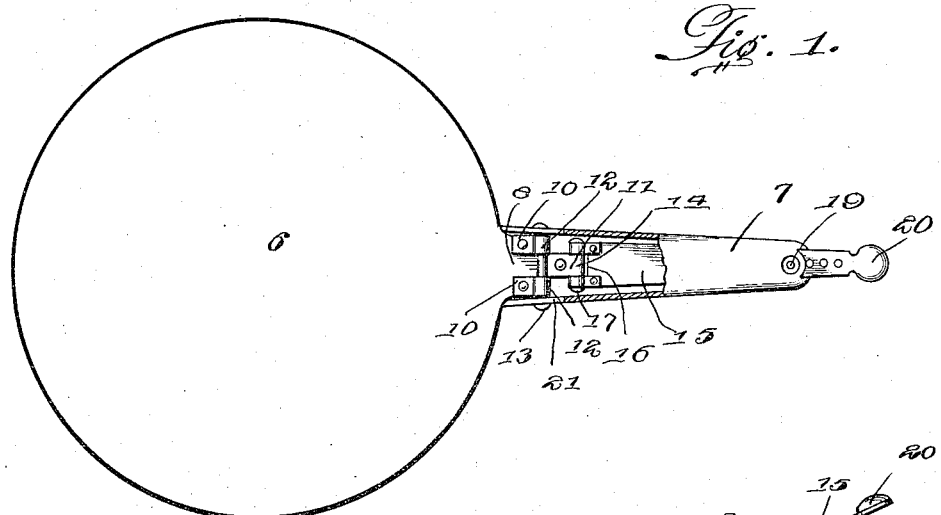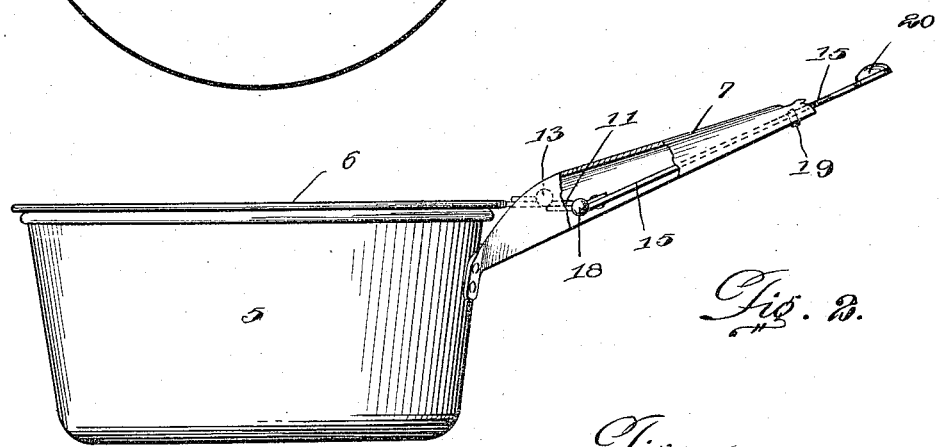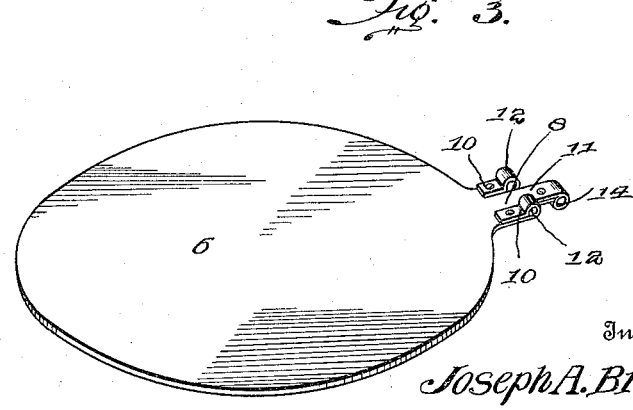

JOSEPH A. BROCKEN, OF HOBOKEN, NEW JERSEY.

KETTLE ATTACHMENT.

1,151,158.

Specification of Letters Patent.

Patented Aug. 24, 1915.

Application filed May 22, 1914. Serial No. 840,327.

*To all whom it may concern:*

Be it known that I, JOSEPH A. BROCKEN, a citizen of the United States, residing at Hoboken, in the county of Hudson and State of New Jersey, have invented new and useful Improvements in Kettle Attachments, of which the following is a specification.

This invention relates to cooking vessels, and more particularly to attachments therefor, whereby the cover may be either raised or lowered without any danger of burning the hands of the user of the device, and locked in any desired adjusted position.

Another object of the invention is the provision of a device of the above mentioned character, which is simple in construction, cheap to manufacture and readily and easily manipulated for the above mentioned purposes.

Other objects of the invention will appear as the nature of the same is better understood, the invention residing in the combination, construction and arrangement of parts hereinafter more fully described.

In the drawing forming a part of this application, like numerals of reference indicate similar parts in the several views, and in which;

Figure 1 is a top plan view partly in section. Fig. 2 is a side elevation partly in section. Fig. 3 is a detail perspective view of the cover.

Referring more particularly to the drawing 5 indicates a receptacle which may be made of any suitable construction, provided with a cover 6 and a hollow oval-shaped handle 7.

The cover 6 is formed with an extension 8 which projects within the handle 7 as shown in Fig. 1. The extension 8 is slit longitudinally to provide spaced tongues 10 and an intermediate tongue 11, the former being bent forwardly upon themselves to provide alined pintle eyes 12 which receive the pintle 13, the latter being passed through the handle 7 and thus pivotally connecting the cover therewith. The intermediate tongue 11 extends a short distance beyond the pintle eyes 12 and is bent rearwardly upon itself to provide a depending pintle eye 14.

Arranged to reciprocate within the handle 7 is the cover operating handle 15, which as shown in this particular instance consists of a flat elongated arm bifurcated at its inner end as at 16. The extensions of the bifurcated end portion are bent upon themselves to provide spaced pintle eyes 17 between which is arranged the pintle eye 14 of the tongue 11. Passed through the eyes 17 and 14 is a pintle 18, providing a movable pivotal connection between the cover 7 and the handle 15.

The handle 15 extends a considerable distance beyond the open end of the handle 7 and is provided with a longitudinal series of spaced apertures adapted for interchangeable engagement with the fixed stud 19, which projects within the handle 7 from the bottom and adjacent the open end thereof. Manifestly by reason of this construction and arrangement the cover and handle 15 may be locked in any adjusted position. The free end of the handle 15 is formed to provide a finger hold as at 20.

Briefly stated, the use of the device is as follows: When it is desired to raise the cover, the handle 15 is lifted out of engagement with the stud 19 and pushed inwardly, thus lowering the pivot 18 and tongue 11, and causing the cover to move upon its fixed pivot 13 to open position. The top portion of the handle 7 is cut away as at 21 to permit of this movement of the cover. The handle 15 is then lowered into engagement with the stud 19, whereupon the cover and handle 15 are locked in a prescribed position. Obviously, to close the cover, this operation is merely reversed.

From the foregoing description taken in connection with the accompanying drawing, it will be manifest that I have devised a construction, which can be easily manipulated to adjust and lock the cover in any desired position, whereby boiling water can be poured off the vegetables, and a device used in other capacities without any danger of burning the hands of the operator.

While I have shown and described, what I at this time consider the preferred form of my invention, I desire to have it understood that the same is merely illustrative, and that various changes in the construction and arrangement of parts may be resorted to when desired, as fall within the scope of the appended claim, without departing from the spirit of my invention.

What I claim is:—

The combination with a receptacle, of a cover therefor formed with an extension arranged within the handle, said extension being split to provide spaced tongues and an intermediate tongue, said spaced tongues being formed to provide alined eyes, a pintle passed through said eyes and handle for pivotally connecting the cover to the handle, said intermediate tongue being formed to provide an eye disposed rearwardly of the pivotal connection of the cover with the handle, a reciprocating element arranged within the handle, said element being bifurcated at one end to provide extensions, the latter being formed to provide spaced eyes arranged at the opposite sides and in aline with the eye formed by the intermediate tongue, a pintle passed through said eyes for pivotally connecting the element with said cover, and means for locking the latter in any angular position.

In testimony whereof I affix my signature in presence of two witnesses.

JOSEPH A. BROCKEN.

Witnesses:
PIERRE GOURGAND,
JULIUS I. KISLAK.